Aug. 7, 1928.
G. A. OVERSTROM
1,679,740
ART OF ELECTRICAL SEPARATION OF FINELY DIVIDED MATERIALS
Original Filed Nov. 24, 1925    2 Sheets-Sheet 1
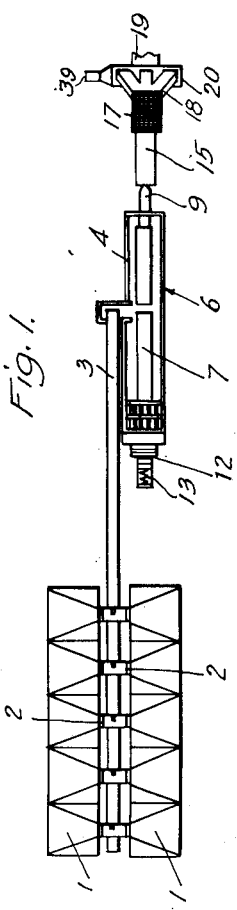
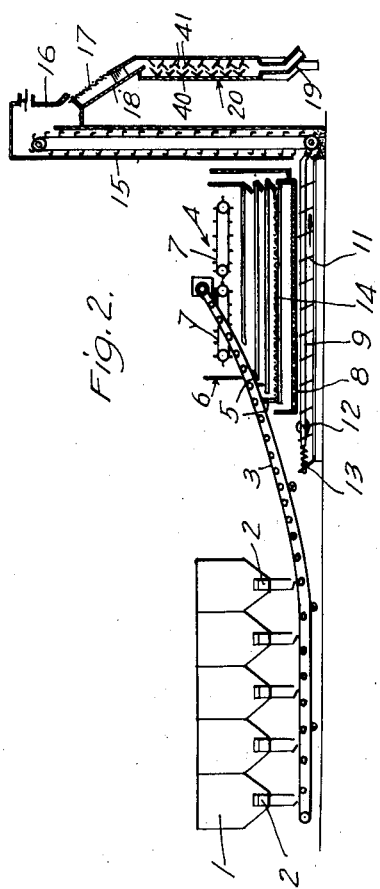
INVENTOR.
Gustav A. Overstrom
BY Arthur P. Knight
& Alfred W. Knight
ATTORNEYS.

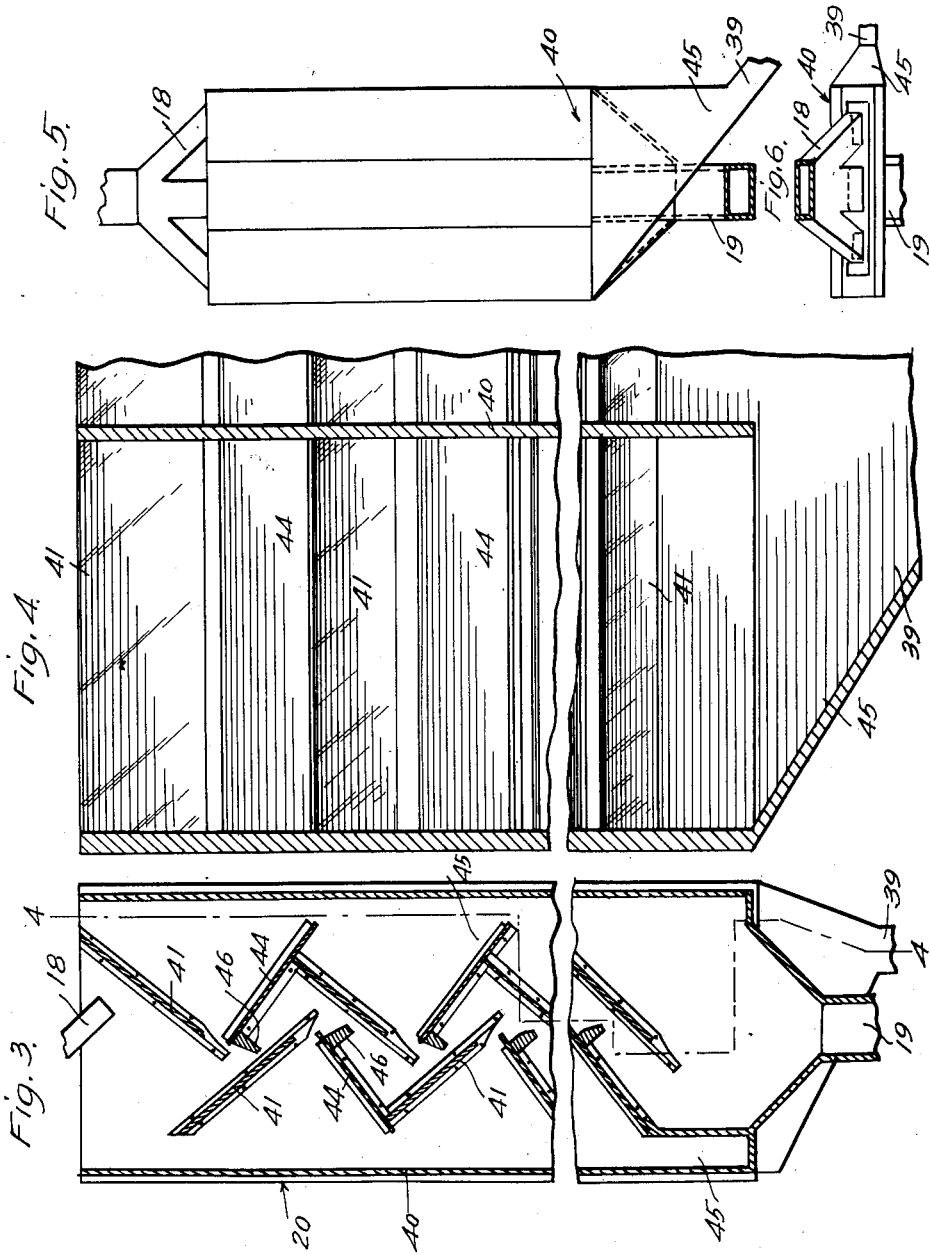

Patented Aug. 7, 1928.

1,679,740

UNITED STATES PATENT OFFICE.

GUSTAV A. OVERSTROM, OF BIG SUR, CALIFORNIA.

ART OF ELECTRICAL SEPARATION OF FINELY-DIVIDED MATERIALS.

Original application filed November 24, 1925, Serial No. 71,212. Divided and this application filed November 23, 1926. Serial No. 150,320.

This application is a division of my United States patent application Ser. No. 71,212, filed November 24, 1925.

This invention relates to a process and apparatus for separation of finely divided materials which are of such nature that they can not be readily separated by screening, tabling, jigging or other means depending upon difference in size or specific gravity of the product. An important object of the present invention is to provide for the separation of such materials without the use of expensive apparatus such as is now required in separators of the so-called electrostatic separator type, in which means have to be provided for producing and maintaining a high potential electrostatic field, requiring considerable expense to install and maintain.

I have discovered that certain mixtures of finely divided materials can be effectively separated by pyro-electric action due to electrification developed in the materials by the action of heat with or without agitation, and without the application of any electrification from an external source, and my process as hereinafter described is based on this discovery.

My invention comprises means for subjecting the finely divided material to certain operations whereby electrification of the material is effected by pyro-electric action without the application of an externally applied electrical field and causing the particles so electrified to become separated from one another by means of such electrification. I have used various means for producing the required electrification, namely, heating or successive heating and cooling of the material, and in some cases agitation, as hereinafter set forth. I have also found that the process can be most effectively carried out when the material is in a substantially dry condition and such drying may be effected by heating the material to a desired temperature in any suitable drier.

When the material has been electrified as stated by the operation of heat, or temperature variation, or agitation, or two or more of such operations the constituents of the material are or may be selectively separated by causing the material to pass in a stream in contact with or in proximity to a separating surface to which certain of the constituents of the material adhere by reason of their electrification while other constituents of the material do not adhere and are consequently separated from the material adhering to such surface. The material adhering to the surface may be collected and removed from time to time or continuously by the action of gravity.

I have found that my process is especially adaptable to separation of certain materials having special properties in respect to development of electrification therein by action of heat and particularly I have found my process to be especially advantageous when applied to separation of materials one or more of whose constituents have marked pyroelectric properties. In certain cases I have found my process is especially applicable to the separation of mica from feldspar and quartz or silica sand containing the same, so as to produce a silica sand which is comparatively free from mica. My process is, however, generally applicable to separation of constituents of more or less finely divided material where such constituents, due to the presence of pyroelectric substances or for other reasons, differ in their tendencies to electrification by action of heat.

I have also found that the nature of the separator body or surface over which the material is passed also has a controlling effect on the separating action and that the separating action can be made most efficient by using the most suitable material for the separator body.

The accompanying drawings illustrate my invention and referring thereto:

Fig. 1 is a plan of the complete installation for treatment of sand or like material to separate the same into its constituents as hereinafter described.

Fig. 2 is a side elevation partly in section of the apparatus shown in Fig. 1.

Fig. 3 is a vertical section of one form of separating apparatus for performing the actual separating operation in the installation above described.

Fig. 4 is a section on line 4—4 in Fig. 3, with parts broken away.

Fig. 5 is a side elevation of said apparatus.

Fig. 6 is a plan view thereof.

The apparatus shown in Figs. 1 and 2 comprises storage bins 1 for the sand or raw material to be operated upon, provided with gates or discharge means, 2 for delivering the material to a suitable conveyor, 3 whereby the same is transported to a suitable dryer indicated at 4. Said dryer may be of any suitable type but I have used successfully the type shown in the drawings comprising a series of steam heated pipes 5 arranged at different levels, one above another within a suitable casing 6, means being provided such as indicated at 7 for distributing over said pipes the material delivered by the conveyor 3. The bottom 8 of the casing 6 is perforated or slotted as shown to permit discharge of the dried material onto a conveyor 9. A screen 14 is preferably located above the lowermost set of heating pipes 5. Said conveyor may be of any suitable construction but is preferably of the reciprocating or shaking type, being for example formed as a table or apron carried by inclined resilient legs 11 and reciprocated in any suitable manner, for example by unbalanced pulley means indicated at 12 so as to cooperate with a resilient bumper indicated at 13 so as to provide the reciprocating movement of the table and continually advance the material thereon in the direction indicated by the arrow.

At the discharge end of the conveyer 9 is located an elevator 15 which is adapted to lift the material to a feed box 16 from whence it passes over a chip screen 17 below which is provided a chute 18 which delivers the material to the upper end of a separator 20 of the type shown in Figs. 3 to 6, said separator being provided at its lower end with separate discharge means 19 and 39 for the two materials separated from one another therein.

The said separator 20 shown in Figs. 3 to 6 comprises a casing or tower 40 and a series of reversely inclined separator plates 41 mounted therein one above another and so arranged that material deposited on the uppermost plate from the supply chute 18 will travel down on this uppermost plate and will fall successively from each plate 41 to the next, such material as is not separated being finally discharged through a chute 19. Below each separator plate 41 is arranged a skimmer plate or member 44, which is inclined downwardly and outwardly so as to cause material falling from the under side of each separator plate on to the subjacent skimmer plate to travel downwardly and outwardly on the skimmer plate into a discharge chute 45 located at each side of the vertical series of separator plates. Each skimmer plate may also be provided with a deflector 46 adapted to guide material falling off the top of the overlying separator plate onto the next lower separator plate. The operation of this separator will be described hereinafter in connection with the operation of the complete apparatus but it may be stated here that the operation of this separator is dependent upon the fact that when the electrified material passes over any of the separator plates 41 a constituent of such material is caused by the electrical action to pass around the lower end of the plate away from the stream of material falling onto the next plate and eventually falls by gravity onto the skimmer where it is separated from the rest of the material being treated.

I will describe the operation of my process as applied to the treatment of a certain variety of sand for separation of mica from the other constituents thereof, namely, what is known as Del Monte sand obtained near Pacific Grove, Monterey County, California, and containing about 52% quartz, 46% feldspar, 2% mica, lime, magnesia, etc.

The material is supplied from the storage bins 1 to the conveyor 3 which delivers it to the drying means 4, wherein it is subjected to the drying action of steam coils or other suitable apparatus so as to condition it for the electrical separation as well as for the market demand for dry sand, this drying operation being an important primary stage in the operation since the production and retention of electrification of the material is dependent upon the same being dry or free from superficial or absorbed moisture which would tend to immediately discharge any electrification thereon. The steam coils or steam heating means in the dryer are preferably maintained at a temperature of about 210 degrees Fahrenheit for the material above referred to so that the material is not only dried but is heated about to that temperature in passing through the dryer. The sand may be distributed in the dryer by operation of the distributing means 7 and falls by gravity between the steam pipes 5 onto the perforated bottom 8, its flow being regulated by screen 14 which prevents the same from passing therethrough until it is dry, it being understood that the sand will not flow freely through the meshes of the screen until its packing tendency is eliminated by the drying. The dried sand falls onto the perforated bottom 8 and passes through the perforations thereof onto the conveyor 9 which delivers it to the bottom of the elevator 15. When passing through the dryer and over the conveyor and in its elevation in the elevator the sand is subject to more or less agitation and this may contribute to some extent to the electrifying effect. The elevator delivers the sand over the screen 17, any coarse material being separated by the screen and the sand free from such coarse material passing through the screen and being delivered by chute 18 to the top of the separator 20 wherein the separation takes place. In this connection I would state that it is impracticable to use a finer screen than 16 mesh for this purpose (with 20 to 80 mesh sand) for the reason that the electrification of the sand by operation of the heat at this stage is generally such as to cause it to adhere to the screen and to prevent it from passing through a fine mesh screen.

In this separating operation the sand falls onto the plates 41 which in the case of materials such as above described may consist of glass, the dry sand being delivered to the uppermost plate at a temperature of about 160 to 165 degrees Fahrenheit and descending by gravity over the surface of this glass plate and then falling onto the next glass plate and descending in this manner over each plate and from plate to plate until the sand, or such part of the same as is not separated in the operation, passes out at the chute 19 at the bottom of the separator. Under the conditions stated I have found that part of the mica (biotite) present in the sand is repelled from the descending stream of sand and falls onto skimmers 44 which conduct it to discharge chute 45. Another part of the mica is carried around the lower edge of each glass plate and adheres to the back of the plate, whereas the quartz and feldspar tend to pass directly from each plate onto the next lower plate. The mica separated in this manner tends to pass upwardly to that part of the back of the glass plate which is about opposite the zone where the sand falls onto the top of the plate and adheres to such portion for a time but is eventually released and falls onto the skimmer plate 44 and is conducted by the same to a discharge chute 45, this separated mica being eventually discharged from the chute 45 through outlet 39 to any suitable receiving means. The skimmer plate in case of treatment of the material above referred to may consist of paper board, or similar material. The product which passes out at the discharge chute 19 from the separator is or may be substantially free from mica but contains quartz and feldspar in substantially the original proportions, the amount of mica (½%) present being relatively small.

My process as above described is based on the fact that certain materials when subjected to temperature changes, for example to heat, or to heating followed by cooling are electrified, such electrification being due to properties of the materials themselves or to their properties relative to other materials with which they are in contact. I have found that the electrifying action is most marked in the case of materials one or more of the constituents of which are pyroelectric, that is to say have the property of becoming electrically polarized when the temperature is rapidly changed and such materials are especially susceptible to separating action by my process. Thus certain crystallized minerals like quarts, tourmaline, boracite, calamine, etc., will develop simultaneous positive and negative charges of electricity on different parts of the same crystal when its temperature is suitably changed, and inasmuch as my process of separation operates most effectively, in some cases, in the presence of minerals having pyroelectric properties, it may be assumed that the separation is based in large part on pyroelectric action and the following explanation is offered on that basis. This process, so considered, consists of heating a mixture of comparatively finely divided particles like sand containing a pyroelectric mineral to a relatively low temperature, usually about 175 degrees Fahrenheit, and allowing the mass to cool to a certain extent, whereby the before mentioned electric charges developed. The finer grain develop their charges sooner than the coarser but also lose their charges sooner. Moreover, the mineral being treated, may tend to lose electrification of one polarity more rapidly than that of the opposite polarity, and the sands or grains may thus become charged either negatitvely or positively. For example, mica being flaky loses its heat rapidly when falling in air down an incline; the finer sand grains coming in contact with the mica first lose one of their charges to the mica and the opposite to the medium over which the mass travels or into the air or to another mineral present but very often, and in the case of one kind of sand I am separating, both the mica and another mineral (feldspar) become charged as of the same sign, and so repel each other. A very good separation, in fact we may say perfect, of biotite (black) mica from quartz and feldspar is accomplished by allowing the warm stream of sand to run over a series of stationary glass plates as above described, the paper board skimmer catching the mica that has been repelled from the stream of sand as well as the mica which has been attracted to the under side of the glass and subsequently becoming charged by contact with said plate, is repelled therefrom.

As indicating the variations in effect with different materials, it may be stated that when handling blown dune sand (known as the Del Monte white sand) the glass plates are plus (+) but when handling a somewhat coarser sand direct from a near-by beach (known as Fan Shell Beach sand) the glass plates are minus (−). The building in which the apparatus and machinery are placed is − when handling Del Monte and + when handling Fan Shell sand. Both of these sands occur near Monterey, California.

The apparatus consisting of stationary glass plates and paper board skimmers is well adapted to separate out mica, vegetation, and various beach shells and spines from the sand. These impurities are not present in quantities of more than a few per cent of the total weight of sand, and the glass plates therefore do not become too thickly crowded with mica to interfere with capacity; the apparatus in use handling at present 25 tons per hour.

Mica separation can best be accomplished at either relatively high or low temperatures but not so well at intermediate ones. When first the pyroelectricity starts to develop in the sand (i. e. shortly after the cooling starts) or after it has developed and has lost part of its charge and the electricity starts to go back into heat again (as I have proven here that it does) the mica separation is easiest; at intermediate points it still separates out equally well, but more sand will go with it, which does not happen at the higher or lower temperatures. Consequently there may be cases where temperature regulation is desirable when making such separations, but as sand in the case referred to is very cheap, the loss of a half or even one ton per day into the mica product is of no economic importance.

It will be understood that my process is applicable to the separation of any two or more materials in sufficiently finely divided condition and presenting the required differences in pyroelectric or other electrifying action under temperature changes to effect the separation. In the case of sand, the material is already sufficiently finely divided, but other materials may have to be crushed or ground or disintegrated before being subjected to the separating process. Furthermore the amount of heating, or of cooling after heating, will depend on the materials being treated, and the choice of the material comprising the separating plates or other stationary members on which the separating action takes place will also depend on the nature of the material being treated. The material used for these plates should in any case be such that the constituent to be separated will adhere thereto, while the remainder of the material will not.

Other sands than the Del Monte sand particularly referred to may also be successfully treated by my process.

In carrying out the separating operation as above described it will be seen that the divided material is first dried and heated and then caused to pass in a descending stream over and from the surface of the stationary separator plates in such manner that a constituent of the material is separated from the descending stream by the action of electrical forces developed in the described operations, and the constituent so separated is then delivered or discharged separately from the rest of said stream of descending material.

I claim:

The method of separating mica from sand containing the same which consists in heating and drying the mixture, and subjecting the mixture to temperature changes in such manner as to develop pyro-electric action in a constituent of the mixture, causing the mixture while so electrified by pyro-electric action to pass over and in contact with a stationary supporting surface of glass and to fall from said surface in such manner that the mica constituent of the sand will separate from the rest of the sand as the latter falls from the glass surface, and separately collecting the mica and the sand constituents so separated.

In testimony whereof I have hereunto subscribed my name this 23rd day of September, 1926.

GUSTAV A. OVERSTROM.